June 28, 1966  LE ROY OVERSTREET, JR  3,257,977
GRASS SPRIG AND ROOT PLANTING DEVICE
Filed Oct. 13, 1964  6 Sheets-Sheet 1

LeRoy Overstreet, Jr.
INVENTOR.

BY
Wayland D Keith
HIS AGENT

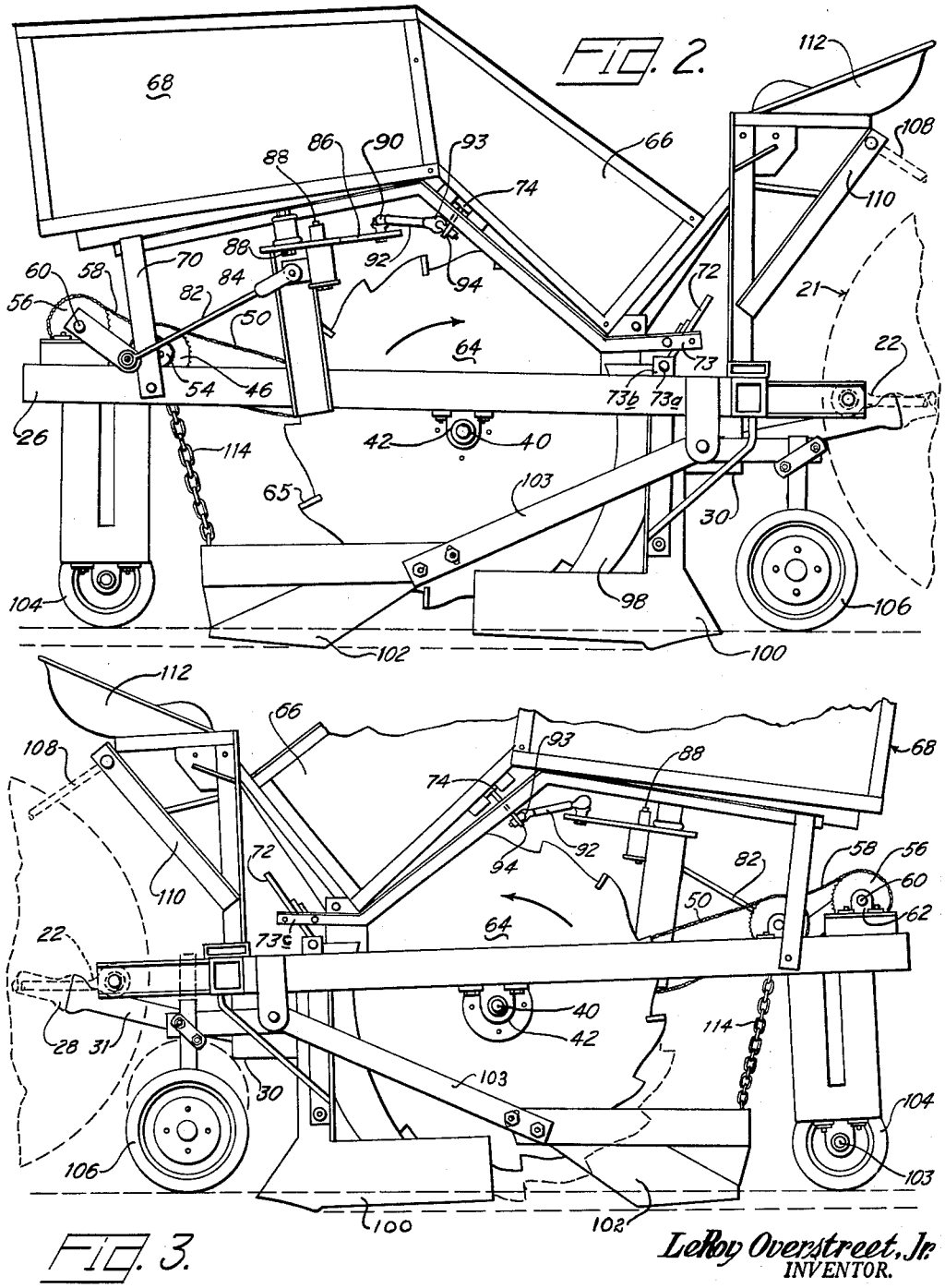

LeRoy Overstreet, Jr.
INVENTOR.

BY
Wayland D. Keith
HIS AGENT

June 28, 1966 LE ROY OVERSTREET, JR 3,257,977
GRASS SPRIG AND ROOT PLANTING DEVICE
Filed Oct. 13, 1964 6 Sheets-Sheet 4
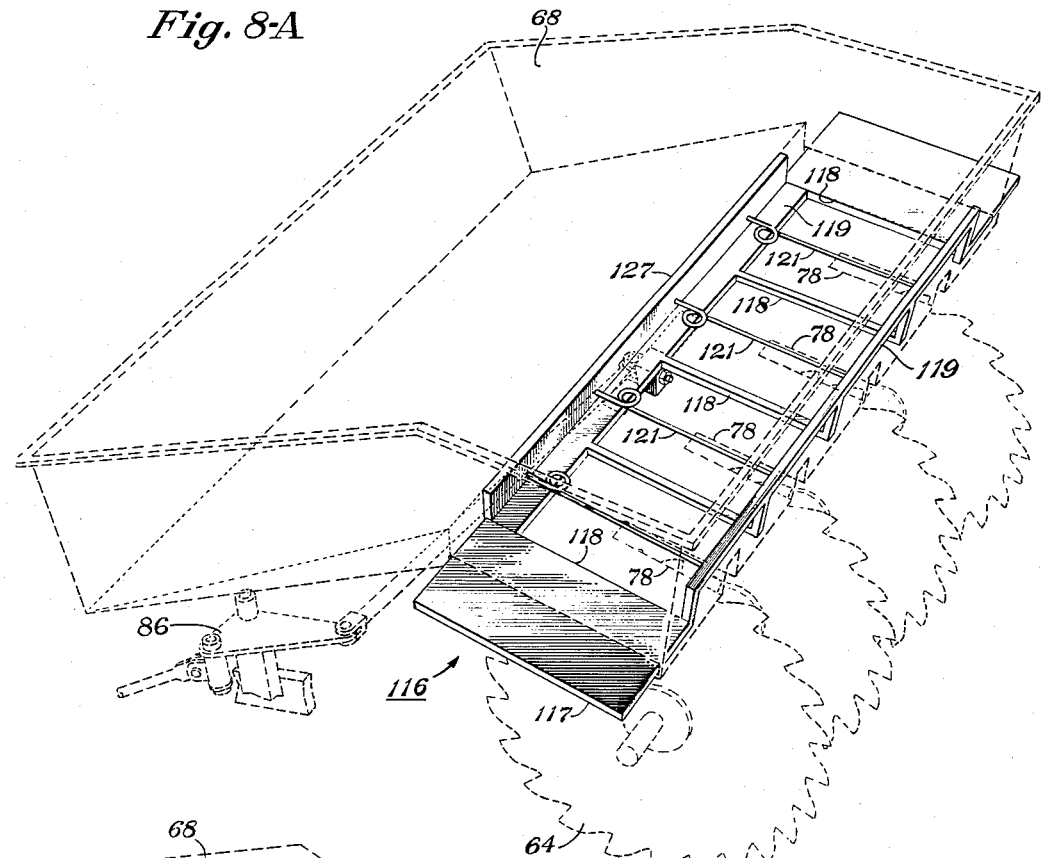
Fig. 8-A
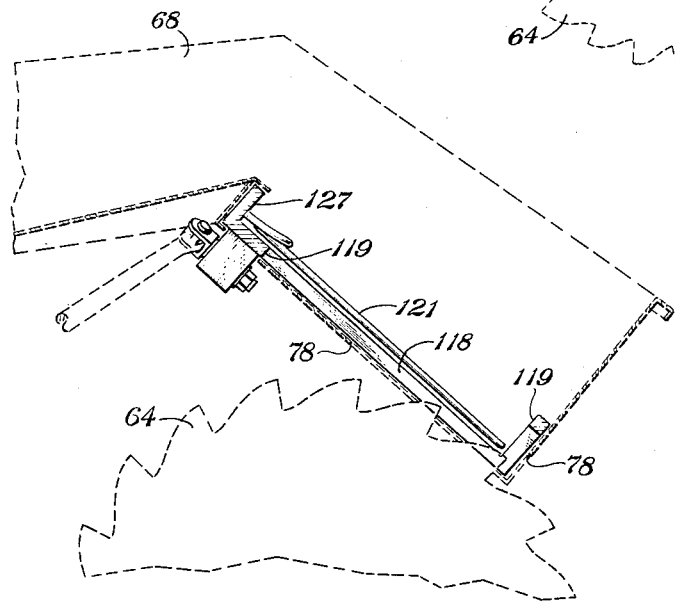
Fig. 8-B

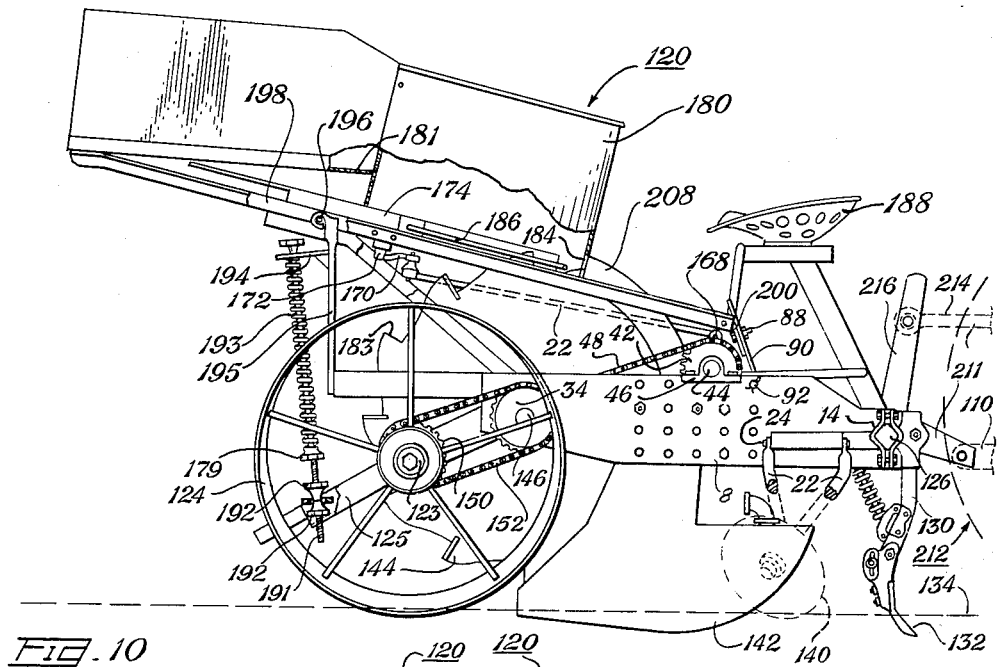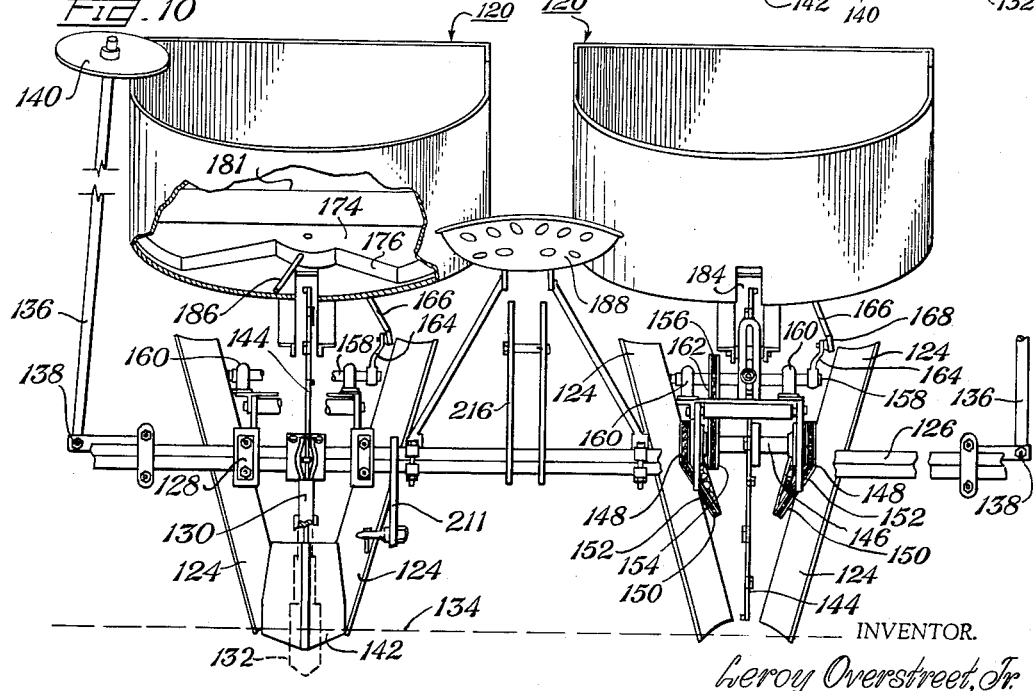

June 28, 1966     LE ROY OVERSTREET, JR     3,257,977
GRASS SPRIG AND ROOT PLANTING DEVICE
Filed Oct. 13, 1964     6 Sheets-Sheet 6
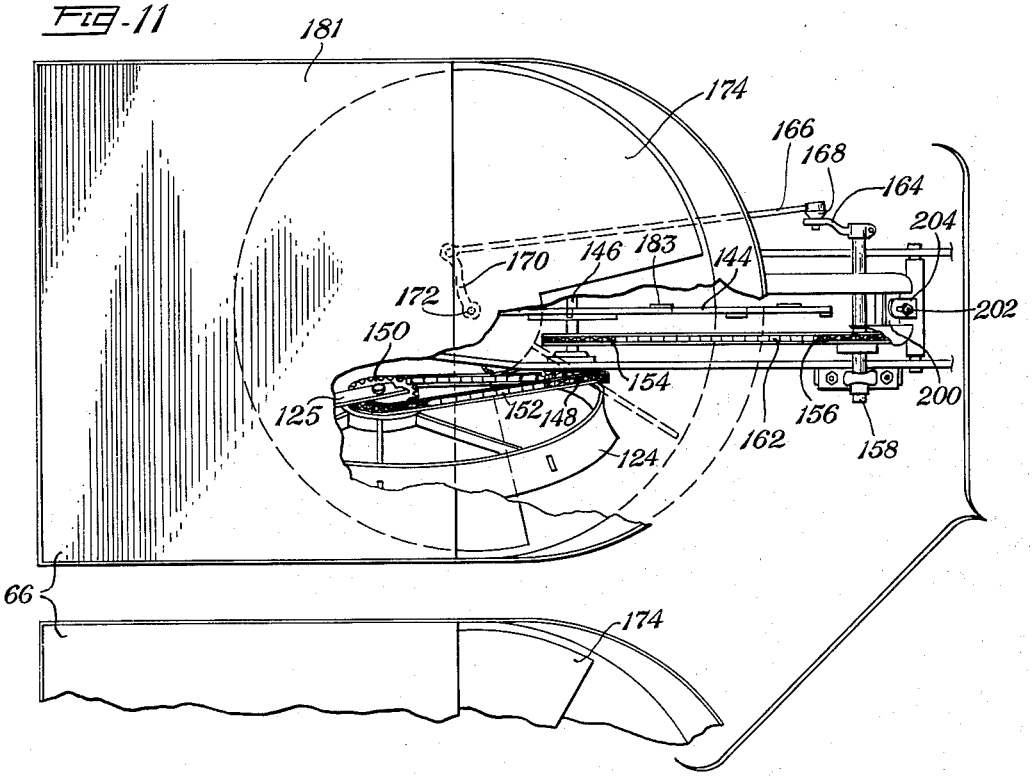
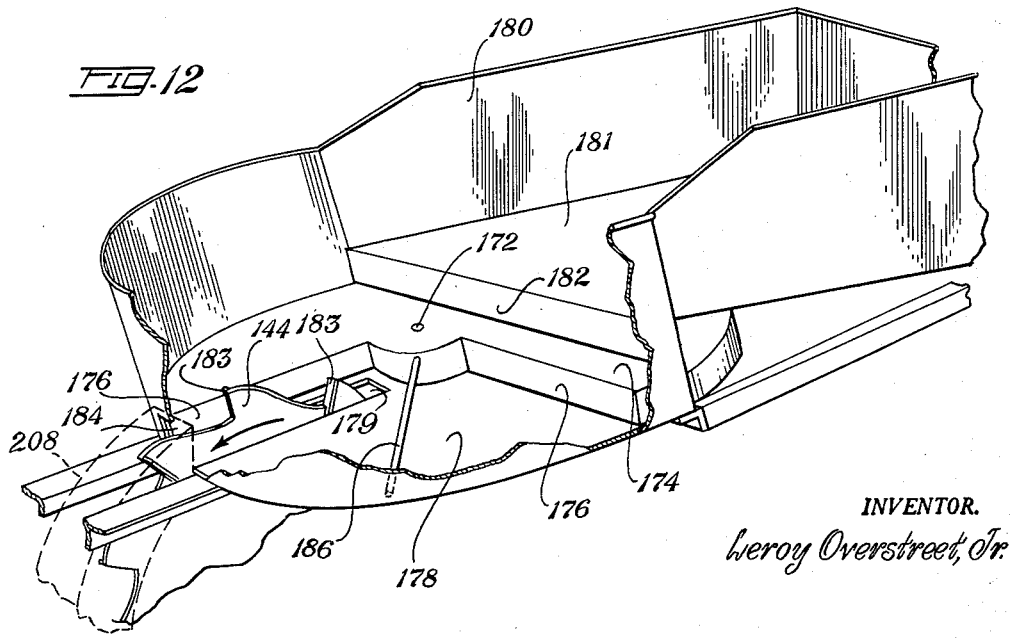
INVENTOR.
Leroy Overstreet, Jr.

United States Patent Office 3,257,977
Patented June 28, 1966

3,257,977
GRASS SPRIG AND ROOT PLANTING DEVICE
Le Roy Overstreet, Jr., Wichita Falls, Tex., assignor to Wichita Equipment Company, Wichita Falls, Tex.
Filed Oct. 13, 1964, Ser. No. 405,328
5 Claims. (Cl. 111—3)

This application is a continuation-in-part of my copending applications, Serial No. 138,886, filed Sept. 18, 1961 and now abandoned, and Serial No. 177,478, filed March 5, 1962 and now abandoned.

My invention relates to improvements in grass sprig planters and more particularly to grass sprig planters which are adapted to carry a reserve quantity of grass sprigs, grass roots or the like to be planted.

Various planters for planting grass sprigs, roots, and the like have been proposed heretofore, but these, for the most part, involved mechanism which required minute attention from one or more workers to keep the grass feeding to the planting mechanism, thereby making the cost of planting the grass so great as to make much of the planting prohibitive in cost.

The present device may normally be operated by one person, and only in certain circumstances would it be necessary to employ an assistant to cause the grass to be fed to the planting mechanism.

Heretofore, much of the grass sprig planting was done by hand, and while the distribution and the coverage was excellent, if done by conscientious workmen as to planting the grass at the desired spacing and properly covering same; however, in view of increasing labor costs, and other factors, such as undependable workers, machines were sought with which to plant grass sprigs or roots. With machines which required more than one operator, the cost was lessened, but not to such an extent as to make the planting of grass, such as Bermuda grass of the various species, including Coastal Burmuda, Pangola, Parah, Carib, Rose Lawn, St. Augustine, and other grasses which grow and spread, either from the roots or from jointed stems, profitable.

An object of this invention is to provide an improved grass spring or root planting device which will open a furrow or a plurality of furrows and which will simultaneously place grass sprigs or roots within the furrow or furrows to the desired depth and "stand" and which will cover the sprigs or roots with soil and will compact the soil in such manner that the grass will readily take root.

Another object of the invention is to provide a grass planter which has the capacity for a reserve supply of grass sprigs or roots, which reserve supply of grass sprigs or roots are so arranged as to be readily fed into position to be dispensed by the planting mechanism of the device.

Another object of the invention is to provide an improved mechanism or agitator for the hopper to positively and continuously feed grass sprigs and/or roots to the mechanism which withdraws the grass sprigs and/or roots from the hopper to be deposited into the ground.

Yet another object of the invention is to provide a grass sprig planting mechanism which may be readily adjusted to vary the quantity of grass sprigs dispensed.

A still further object of the invention is to provide a grass sprig and/or root planting mechanism which is low in the cost of manufacture, efficient in operation, positive in planting action, and which is readily operable within a minimum of attendants.

With these objects in mind and others which will become manifest as the description proceeds, reference is to be had to the accompanying drawings, in which like reference characters designate like parts in the several views thereof, in which:

FIG. 1 is a top plan view of the grass sprig and/or root planting device, with parts broken away to show the details of construction, and with parts shown in dot-dash outline to show alternate positions of certain parts, and with other parts shown in dashed outline to show the relative positions of the broken-away portions, and to show the relative position of the traction element with respect to the planter;

FIG. 2 is a side elevational view of the grass sprig planting device with a portion of the tractor being shown in dashed outline;

FIG. 3 is a view similar to FIG. 2, but of the opposite side of the device;

FIG. 8–A is a fragmentary perspective view showing an alternate and improved form of agitator assembled in the bottom of the hopper.

FIG. 8–B is a fragmentary sectional view, showing a portion of the agitator and the hopper of FIG. 8–A.

Figure 1:
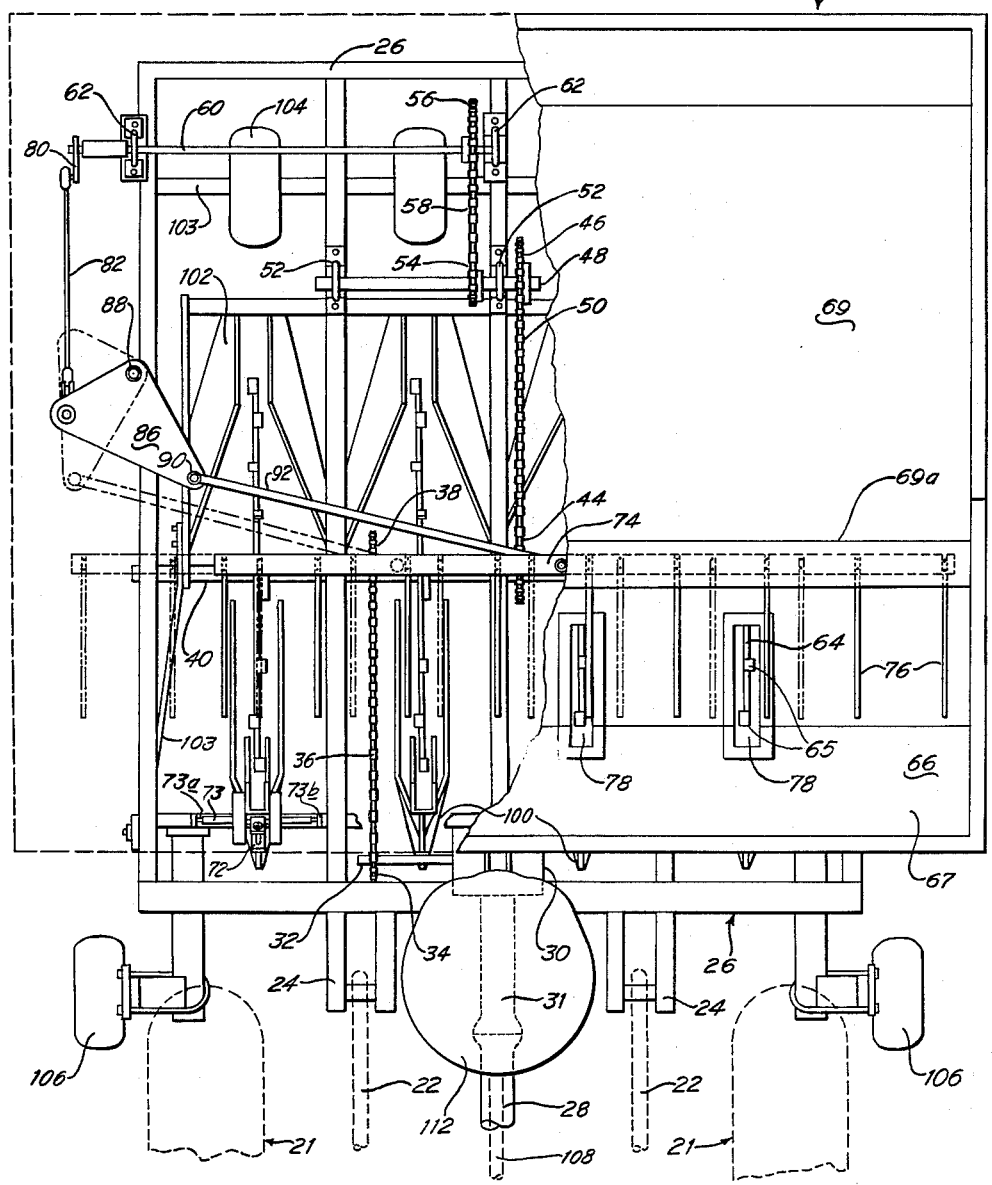

FIG. 9 is a side elevational view of an alternate form of planter for planting grass sprigs and/or roots, showing parts broken away, other parts being shown in section to bring out the details of construction, and showing a portion of a traction element, in dashed outline, attached thereto;

FIG. 10 is a front elevational view of the planter of FIG. 1, showing two units installed on a drawbar, and showing parts broken away, parts being shown in section and shortened to bring out the details of construction;

FIG. 11 is a top plan view of one of the hopper units of the FIGS. 10 and 11 planter mechanism, with parts being broken away and shown in section, and showing a portion of the drive and feeding mechanism, and a portion of one of the compacting wheels; and FIG. 12 is a fragmentary, perspective view of the hopper and spring feeding mechanism of FIGS. 10, 11 and 12, showing portions of the hopper broken away and in section to bring out the details of construction.

With more detailed reference to the drawings, the numeral 21 designates generally a tractor, a portion of the wheels of which are shown in dashed outline, in FIGS. 1, 2, and 3, which tractor has drawbars 22 thereon to connect to complementary tongue members 24 on the forward end of the frame of the planter, which frame is designated generally by the numeral 26.

The device is adapted to be towed by a tractor having a power take-off, which power take-off is preferably of the multi-speed type which rotates the power take-off shaft 28.

A gear box 30 is mounted on frame 26 and has a shaft 31 extending outwardly therefrom, which shaft connects with power take-off shaft 28. The gear box 30 also has a shaft 32 extending outward therefrom which is connected in geared relation with shaft 31 within gear box 30. A sprocket 34 is mounted on and secured to the shaft 32.

Figure 4:
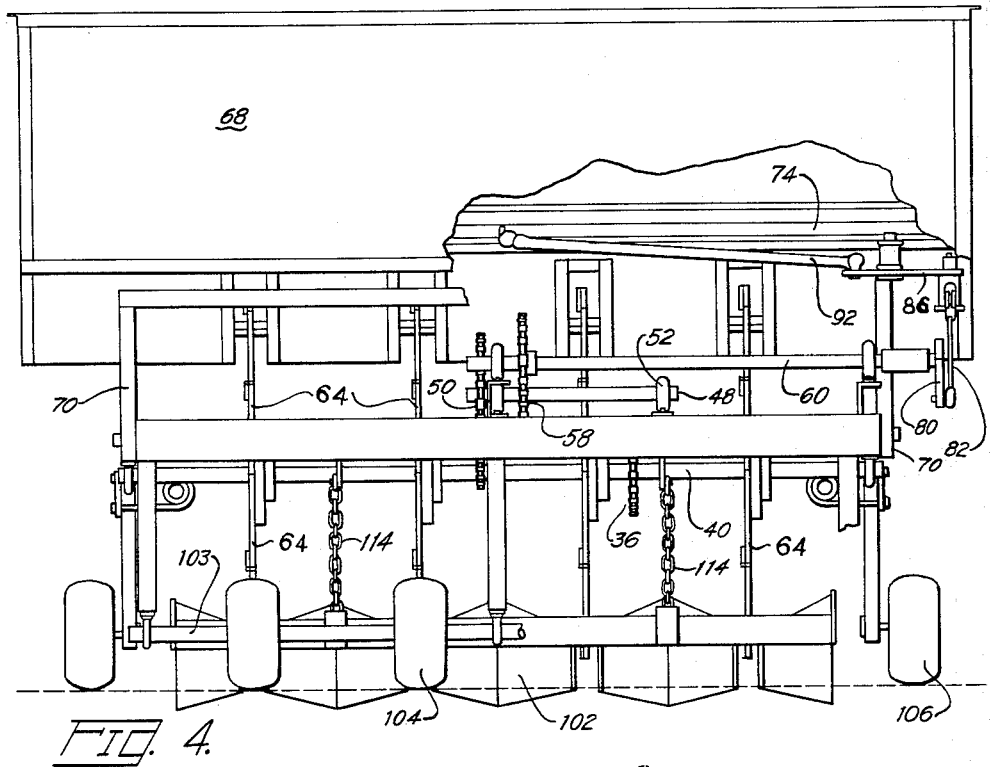
FIG. 4 is a rear elevational view of the planter device with parts thereof being broken away to show the details of construction.

A pair of bearings 42 is mounted on frame 26 to receive a shaft 40 therein in journaled relation. A sprocket 38 is mounted on shaft 40 and is in aligned driving relation with sprocket 34 on shaft 32. An endless transmission chain 36 surrounds sprockets 34 and 38 to connect these sprockets in driving relation to drive shaft 40. A pair of bearings 52 is mounted on frame 26, which bearings journal a shaft 48 therein, as will best be seen in FIGS. 1 and 4. The shaft 48 has a sprocket 46 mounted thereon and secured thereto, which is in aligned driving relation with a sprocket 44 mounted on shaft 40. An endless transmission chain 50 surrounds sprockets 44 and 46 to connect these sprockets in driving relation. A pair of bearings 62 is mounted on frame 26 and journal a shaft 60 for rotation therein. The shaft 60 has a sprocket 56 mounted thereon and fixedly secured thereto, which sprocket is in aligned driving relation with sprocket 54 mounted on and secured to shaft 48. An endless transmission chain 58 surrounds sprockets 54 and 56 to connect these sprockets in driving relation. The sprocket 54 is preferably of smaller diameter than sprocket 56 so that shaft 60 and the agitating mechanism for agitating the grass sprigs and/or roots, which is connected thereto, will be driven at a slower rate of speed than the shaft 48.

Figure 5:
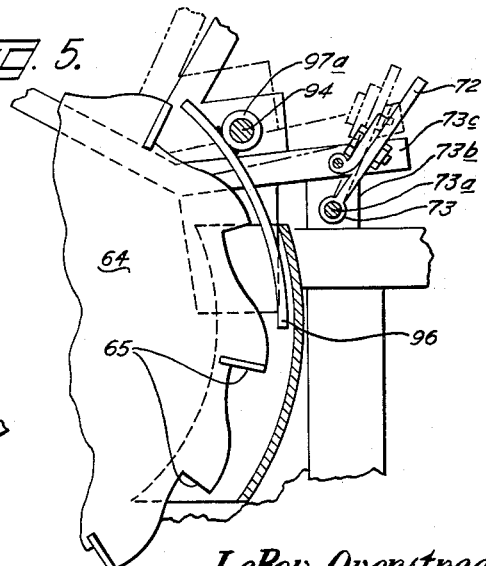
FIG. 5 is an enlarged fragmentary view of a portion of a toothed planting disc and of the hopper adjusting mechanism, showing the hopper adjusting mechanism in one position in full outline, another position thereof being shown in dot-dash outline.
Figure 6:
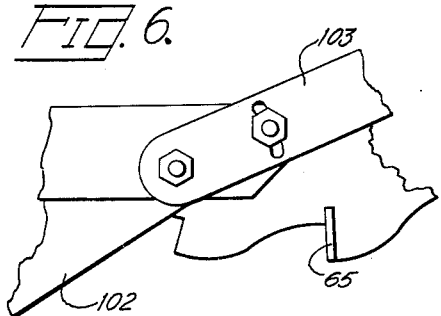
FIG. 6 is an enlarged fragmentary, elevational view of the adjustment device for the covering means.
Figure 7:
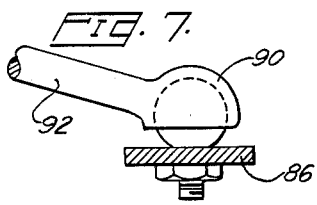
FIG. 7 is a fragmentary elevational view of a ball and socket joint, such as used on the pitmans which actuate the grass sprig feeding mechanism.

A pair of support braces 70 is secured to the frame 26 and extend upward to support one end of a hopper which is designated generally by the numeral 68. Adjustable member 72 has an enlarged eye 73 on the lower end thereof, which surrounds a pivot member 73a which is mounted between upstanding lugs 73b on the forward end of frame 26. The hopper 68 has a pair of forwardly extending members 73c, FIG. 5, on which an apertured member, complementary to adjustment member 72, is pivotally mounted. An adjustment bolt passes through adjustment member 72 and through the member which is pivotally connected to the forwardly extending member 73c to enable the raising and lowering of the forward end of the hopper, as will best be seen in FIGS. 2 and 5. The hopper 68 is of the character to receive a relatively large supply of grass sprigs and/or roots therein, with the rear portion of the hopper providing a storage compartment for the grass sprigs or roots, which are moved forward into the forward portion 66 to enable the dispensing of the grass sprigs and/or roots, as will be explained more in detail hereinafter.

The shaft 40 has toothed disc members 64 mounted thereon and secured thereto for rotation therewith. The forward portion 66 of the hopper 68 has openings 78 formed in the bottom portion 67 thereof, which openings are adapted to register with the respective toothed disc members 64, so a portion of the respective toothed disc members will extend through the respective openings 78, so that the teeth 65 of the toothed disc members 64 will engage the grass sprigs and/or roots to draw these through the respective openings 78, as the disc members 64 are rotated by the drive chain 36 in the direction indicated by the arrows in FIGS. 2 and 3. The grass sprigs or the like are moved downward, as will be more fully brought out hereinafter.

The shaft 60 operates the agitating mechanism to move the grass sprigs and/or roots into feeding relation with the planting mechanism, as will be explained more in detail hereinafter.

The shaft 40 has toothed disc members 64 mounted thereon which are rotatable therewith for dispensing grass sprigs and/or roots from the portion 66 of the hopper 68, which hopper is supported by upright braces 70, which braces are secured between the lower side of the hopper 68 and the frame 26 at one end, and by adjustable member 72 which is pivotally mounted on frame 26 at the opposite end, as brought out above. The hopper 68 has a storage portion and a dispensing or feeding forward portion, as brought out above.

Upon rotation of shaft 60 through drive chains 36, 50 and 58, crank member 80 is actuated to drive the grass sprig agitating mechanism. The crank member 80 is attached to an end of shaft 60 and is rotated therewith. A pitman rod 82 is pivotally connected to crank 80 at one end, the other end of the pitman rod 82 has a pivoted connection 84 thereon which connects the pitman rod 82 with bell crank 86, which is pivotally mounted on frame 26 by means of pivot bolt 88. A ball and socket joint 90 is mounted on bell crank 86 and pivotally connects a pitman rod 92 therewith. A ball and socket joint 93 connects the pitman 92 with a downwardly extending lug 94 on bar 74, so upon rotation of shaft 60, the bar 74, which is slidably mounted on the lower side of portion 66 of hopper 68, is moved back and forth longitudinally, as indicated in FIG. 1. The hopper 68 has a rear bottom portion 69 therein, which extends over an apex 69a thereof, so as to shield the longitudinally movable bar 74 from the grass sprigs, yet permits fingers 76, which extend laterally outward from a side of the bar 74, to extend downward over the front bottom 67 of the portion 66 of hopper 68. These fingers are spaced upward above the front bottom portion 67 of the hopper sufficiently to clear the teeth 65 of the toothed discs 64. The fingers 76 move back and forth, as indicated in FIG. 1, to move the grass sprigs and/or roots across the respective openings 78 which are formed in the bottom 67 of the hopper 68 and into which openings the respective toothed discs extend so that the teeth 65 thereof which extend through the openings 78 will engage the grass sprigs and/or roots to move these downward along the face of guide bar 96 into guide chute 98.

Plows 100 are mounted on the lower side of frame 26 for engaging the earth to open a furrow therein. The grass sprigs then drop into the furrow, and the covering fenders 102, which are mounted on the frame 26 rearward of the plows 100, direct the dirt inward into the furrow, thereby covering the grass sprigs the desired amount, whereupon, a compacting wheel 104, which is mounted on frame 26 rearward of fenders 102, compresses the earth into the furrow so as to insure contact of the soil with the grass sprigs.

It is preferable to run the toothed planter discs 64 faster than if the discs were rolling over the terrain over which the device passes; however, as pointed out above, the power take-off drive shaft 28 is preferably driven by a multispeed transmission whereby the toothed discs 64 may be driven at the desired speed, indicated by the terrain over which the device passes. The speed of the rotation of the toothed discs is one factor in determining the amount of grass sprigs planted for the linear distance traveled by the planter; however, raising or lowering the forward or feeding portion 66 of the hopper 68 the distance which the toothed discs 64 extend into the hopper, is also a determining factor in the amount of grass sprigs planted, since the higher the forward portion 66 of the hopper 68 is raised, the fewer grass sprigs will be engaged by the teeth 65 of the discs 64, therefore fewer sprigs will be dispensed; conversely, however, while running at the same speed, if the forward portion 66 of the hopper 68 is lowered, more sprigs will be planted, because the teeth 65 engage more deeply into the feeding portion of the hopper to contact and bring down more grass sprigs.

Gauge wheel 106 are shown as being connected to the forward end of frame 26, and when the device is towed behind a tractor 21, which does not have the usual power lift, these gauge wheels are utilized to gauge the depth at which the plows 100 engages into the earth in which the grass sprigs are to be planted; however, it is preferable that a lift connecting link 108 be connected to the tractor 21 and to brace 110 on the planter unit frame 26, so the entire planter unit may be lifted clear of the ground by the conventional hydraulic power lift, such as hydraulically actuated draw bars 22, which are present on most tractors.

A seat 112 is provided on the forward end of frame 26, so when an assistant is needed to rake additional grass forward from the storage portion of the hopper 68 into the forward portion 66 thereof, he may sit at his work. However, if the operator of the tractor is working without an assistant he may use a rake to move the grass from the storage portion 69 of the hopper 68 into the feeding portion 66 thereof, while driving.

A chain 114 is connected between frame 26 and the rear end of covering fenders 102, so when the entire planter is lifted clear of the ground, as by the hydraulic lift draw bars 22 in conjunction with lift connecting link 108, the fenders 102 will also be lifted by the chain 114, however, the chain 114 is sufficiently loose, that it will not hinder the rising and falling of the fenders 102, as the planter is moved over rough terrain.

In operation, the planter is connected to draw bars 22 of the tractor by tongues 24 with the usual connections, and with the lift connecting link 108 connected to brace 110, if a power lift is used, and with the power take-off drive shaft 28 connected in driving relation with gear box 30 on planter frame 26, the device is ready to operate. Upon the turning of drive shaft 28, as the planter is towed over the terrain by the tractor 21, the sprocket 34 on shaft 32 will drive through chain 36 on sprocket 38 to rotate shaft 40. The shaft 40, in the present instance, has four toothed discs 64 mounted thereon, which are fixedly secured thereto for rotation therewith. When the plows 100 engages the ground to open a furrow of the correct depth, and when grass sprigs are supplied to the hopper 68, particularly to the portion 66 thereof, the teeth 65 of discs 64, which project through openings 78 in the bottom portion 66 of the hopper 68, will contact the sprigs of grass and move them downward and out of the portion 66 of the hopper, which sprigs of grass will be held within the teeth 65 by a guide bar 96 for a portion of the arcuate movement of toothed discs 64, whereupon the grass will be passed into a chute 98 which extends into close proximity with the furrows being opened by the plows 100, from which chute the grass sprigs are dropped into the furrow. Whereupon, the soil which has been moved outward by the plow 100 will be raked inward by covering fenders 102, which fenders converge on each side of each furrow, toward the rear of the planter. A compacting wheel 104 is provided immediately rearward of each pair of fenders 102 and centrally of the respective furrows, so as to compress the soil about the grass sprigs and/or roots being planted.

As the supply of grass in the forward or feeding portion of the hopper 68 diminishes, further sprigs and/or roots of grass are moved toward openings 78 by the fingers 76 which are positioned on longitudinally movable bar 74, which bar is driven by chains 50 and 58 which pass over sprockets on shafts 40, 48 and 60, which shaft 68 in turn, rotates the crank member 80 which is connected to a pitman 82 to actuate the bell crank 86 to move the bell crank and pitman rod 9, as indicated in full outline and in dashed outline in FIG. 1, which pitman rod 82 is connected to longitudinally movable bar 74 by a ball and socket joint 93.

It is to be pointed out that the fingers 76 are positioned at an elevation slightly above the bottom 67 of the forward or feeding portion 66 of hopper 68, and teeth 65 on toothed member 64, however, due to the springiness of grass sprigs, the grass will be raked into close proximity with teeth 65 for movement through openings 78.

An alternate and improved mechanism for agitating the grass is illustrated in FIGS. 8–A and 8–B, where the hopper 68, the toothed discs 64, and the drive mechanism 115 appear in phantom. The agitator mechanism 116 includes a frame having plates 117 on each end thereof and a plurality of spaced transverse abutments 118 which span side bars 119. Each elongated opening 78 through which the tooth discs 64 protrude has an abutment 118 on each side thereof since the interior edges of the plates 117 serve as the outermost abutments. Fingers 121 (similar to the fingers 76 of FIG. 1) are attached to the frame of the agitator mechanism 116 by means of the elongated bar 127, which in turn is attached to one of the side bars 119. It should be noticed that the plates 117 extend through the walls of the hopper 68.

As in the FIG. 1 device, the agitator mechanism is reciprocated by means of attachment to the pitman rod 92 and thus to the oscillating bell crank 86. The stroke of the agitator mechanism 116 and the spacing of the abutments 118 and the elongated slots 78 is such that the abutments 118 closely approach but do not engage each respective tooth disc 64. Also, the stroke and configuration of the agitator mechanism is such that the plates 117 are always underneath the side walls of the hopper 68.

Thus, as the frame of the agitator mechanism 116 reciprocates or moves back and forth along the bottom of the hopper, the fingers above the toothed disc 64 rake the grass sprigs and/or roots across the teeth. In addition, the abutments 118 feed the grass in a direct manner toward the elongated opening 78 and help prevent any abridgement or clogging of the grass, dirt or foreign matter on the bottom of the hopper. Since the plates 117 extend beyond the walls of the hopper, no grass or dirt can collect in the corners of the hopper to interfere with the operations of the agitator mechanism or the planting operation.

The alternate form of planting mechanism shown in FIGS. 9–12 and designated generally at 120, has a frame 122 which has support wheels 124 journaled thereon near the rear end thereof. Each wheel 124 is mounted on a separate axle, each axle being inclined upwardly and inwardly so that each of the wheels 124 has a particoncave surface with the larger diameter being toward the outside so as to form a compacting element for compacting the soil about freshly planted grass sprigs and/or roots.

The present device is made in separate units, as indicated generally at 120, FIGS. 1 and 2, and is attached to a transverse drawbar 126. The drawbar 126 is attachably mounted on the forward ends of the frames 122 by clamps 128. A plow shank 130 is mounted on the forward end of each of the frames 122 and each shank 130 has a furrow opening plow 132 thereon. Each plow shank 130 may be adjusted vertically to cause the plow 132 to engage the surface 134 of the ground at different depths in which grass sprigs and/or roots are being planted.

The planter 120 for planting grass sprigs and/or roots has an arm 136 extending outward from each side of the outermost frame 122, each arm being pivotally mounted, as indicated at 138, so the disc 140 on the outer end of each arm is journaled on the arm 136 at an angle with respect to the direction in which the planter is traveling. The mounting arrangement of the discs will cause a cutting or marking action along the surface of the ground to aid in planting further rows of grass sprigs and/or roots. It is preferable to raise one of the arms 136 and lower the other of the arms while the planter is traveling in one direction and to lower the other of the arms and to raise the arm previously lowered while the planter is traveling in the opposite direction. In this manner the surface of the ground may be premarked as the planting is accomplished. A bifurcated plow or coulter-like member 142 is mounted rearwardly of each plow 132 and engages into the furrow opened by plows 132 as the planter moves forward over the surface of the ground.

A toothed grass sprig and/or root feeding disc 144 is secured to a shaft 146 within frame 122, which shaft has a transmission sprocket 148 thereon, on each side of the disc 144 and secured thereto. Each of the wheels 124 has a transmission sprocket 150 mounted thereon and secured thereto so as to be in driving relation with the respective transmission sprockets 148 on shaft 146. Chain 152, such as a loosely joined agricultural machinery chain, passes over the respective pairs of sprockets 148 and 150 or the like on each side of the toothed grass sprig and/or root feeding disc 144 to form power driving means. A sprocket 154 is mounted on and secured to shaft 146 and is in aligned driving relation with sprocket 156 mounted on and secured to pitman shaft 158. The pitman shaft 158 is journaled in bearings 160 on frame 122. A chain 162 surrounds sprockets 154 and 156 so upon rotation of shaft 146 shaft 158 will be rotated to rotate crank arms 164 thereon, which shaft is mounted on frame 122 transversely thereof, about the axis of shaft 158. A pitman rod 166 is connected to each crank arm 164 by a ball and socket joints 168.

Each pitman rod 166 extends rearward and connects with each arm, each arm 170 being mounted on the lower end of an upstanding shaft 172, which upstanding shaft is journaled in the lower portion of each hopper and each has an agitator member mechanism 174 secured thereto on the upper end thereof, as will best be seen in FIGS. 9, 10 and 12. Each arm 170 is proportionately longer than the crank arm 164 so that the agitator mechanism 174 will be oscillated through approximately ninety degrees. The agitator mechanism 174 has a cut-away portion 176 on the forward side thereof which is of such thickness as to create a definite recess 178 in the forward end of each hopper 180. Each hopper 180 has a floor therein which has an offset portion 182 which will register approximately with the sides or abutments edges of cutaway portion 176 when the agitator mechanism 174 is in each extreme position, and since the agitator mechanism oscillates through approximately ninety degrees, the grass sprigs and/or roots which drop into recess 178 are moved toward the respective toothed feeding discs 144, and since the toothed feeding disc 144 rotates at a predetermined, geared relation with respect to the terrain traversed, the respective teeth 183 on each disc 144, FIG. 12 will withdraw the grass sprigs and/or roots from recessed portion 178 and pass these through a slot 184 in the forward edge of each hopper 180, whereupon the grass sprigs and/or roots are moved downward into a bifurcated plow or hollow coulter 142, which coulter is immediately rearward of furrow opening plow 132.

The agitator mechanism 174 preferably has an outstanding finger 186 mediate the sides or abutments of cut-away portion 176 of agitator mechanism 174 so as to urge grass sprigs into close proximity to the teeth 183 of the toothed feeding disc 144, and since the agitator mechanism 174 makes substantially a ninety degree arc, each face of the cut-away portion 176 thereof urges the grass sprigs and/or roots into close proximity to the teeth 183 upon each arcuate movement of the agitator. In this manner all the grass sprigs and/or roots within the recess 178 which are brought in close proximity to the feeding disc 144 are engaged by teeth 183 of each disc 144 and are discharged outward through slot 184 in the forward lower side of each hopper 180.

Each hopper 180 has the floor 181 thereof inclined downwardly and forwardly so the grass sprigs and/or roots will move downward into recess 178 by gravity as the grass sprigs and/or roots are withdrawn therefrom as the device travels over the terrain. A seat 188 is mounted on the transverse drawbar 126 intermediate a pair of planter units 176 so as to enable an attendant to watch the progress of the planting and to assist the movement of the grass sprigs and/or roots downward in the hopper 180, in the event the grass is not feeding downward as rapidly as it should.

Each wheel 124 is canted at such an angle as to urge the dirt, which has been moved outwardly by coulter 142 back into the furrow so as to surround the grass sprigs and/or roots and compress the soil around the grass sprigs and/or roots.

Each axle 123 supports an arm 125 in journaled relation thereto, each axle 123 having a wheel 124 mounted thereon. Each of the arms 125 is apertured to receive a threaded bolt 191 therethrough. Each bolt 191 has nuts 192 screw threaded thereonto, each of which nuts 192 has a reduced end to extend through the aperture in arm 125. The nuts 192 lock together so as to give a limited movement of the nuts within the apertures of the respective arms 125. Each bolt 191 extends upward through an apertured lug 194, which apertured lugs 194 extend outwardly from each upstanding bar 195. The bars 195 are mounted on the rear end of each frame 122 near each side thereof. A spring 193 is slid over each bolt 191 and is in engagement with the lower face of each apertured lug 194 at the upper end thereof and with a threaded nut 197 intermediate the length of each bolt 191 to form an abutment thereon to receive the lower end of each spring 193 to hold the spring 193 in compression. This arrangement will enable each of the wheels 124 to be individually spring supported with respect to the frame 122, thereby enabling the plow 132 and coulter 142 to be maintained in the ground at a substantial uniform depth. Since each arm 125 is pivoted about the axis of shaft 146 on which sprocket or transmission wheel 150 is mounted, the up and down movement of the respective wheels 124 with respect to the frame 122 will not vary the center distance of chain or transmission element 152. At the same time, each spring 193 can be so adjusted that each wheel 124 will exert a substantially uniform pressure on the soil to cover the grass sprigs and/or roots and to compact the soil to the desired extent therearound.

Each upstanding bar 195 at the rear of the frame 122 is apertured to receive a pin 196 therethrough, which pin also passes through an aperture of bar, which bar 198 pivotally supports hopper 180 on frame 122. The forward end of bar 198 has a down turned, apertured lug 200 thereon, which lug is adapted to receive a bolt 202 therethrough and through an upstanding slotted lug 204, which lug 204 is pivotally mounted on frame 122 by a pivot pin 206, as will best be seen in FIG. 1 to form a pivot connection between the hopper and the frame. By pivoting the bar 198, the forward end of hopper 180 will be raised and lowered with respect to toothed feeding disc 144, as the lower the position of the hopper, the higher teeth 183 of disc 144 will project thereinto, and the greater the amount of grass sprigs and/or roots that will be fed therefrom, and conversely, by raising the forward end of the hopper and securing it in adjusted, fixed relation by bolt 202, the teeth 183 of disc 144 will project upward through elongated slot 179 into the hopper 180 a lesser height, therefore a lesser amount of grass sprigs and/or roots will be discharged.

A discharge chute 208 is secured to the forward end of hopper 180 as is best seen in FIG. 9, which covers the upper, forward portion of the outer periphery of grass sprig and/or root feeding disc 144, so that the teeth 183 thereof will carry the grass sprigs and/or roots out through slot 184 and between the inner faces of coulter 142 and thence downward into close proximity to the furrow being opened by plow 132.

In operation of the FIGS. 9–12 device, one or more planter units 120 are attached to the draw bar 210 of a tractor 212 by means of hitch 211, and power lift arms 214 are attached to upright arms 216 which are mounted on transverse draw bar 126 so that the unit 120 may be raised or lowered by the conventional power lift of the tractor in a manner well understood in the art of agricultural implements.

With the hopper 180 filled with grass sprigs and/or roots and with the forward end of frame secured in fixed adjusted relation with respect to frame 122 and bolt 202 securing lugs 200 and 204 together so that the teeth 183 of feeding disc 144 will extend upward through slots 179 into the lower forward end portion of hopper 180, and with the wheels 124 resting on the surface of the ground, with the furrow opening plow 132 engaged into the ground, the planter is drawn across the terrain. The plow 132 will open a furrow whereupon, bifurcated plow or coulter 142 will move the dirt outward, and with the toothed feeding disc 144 rotating in the direction indicated by the arrows in FIG. 12, the desired amount of grass springs and/or roots will be fed from the hopper to move outward through slot 184 and downward through chute 208 in and through coulter 142 into furrow 134. And, with the grass sprigs and/or roots thus positioned within the furrow opened by plow 132 the parti-concave wheels 124 will move the loosened dirt back into the furrow around the grass sprigs and/or roots and will compact the soil therearound, so as to present the sprigs and/or roots in a uniformly distributed manner.

By varying the relative elevation of the hopper 180 with respect to the toothed feeding disc 144, the quantity of grass sprigs and/or roots may be varied proportionately. A seat 188 is provided forward of the hopper 180 so an operator or attendant can rake the grass sprigs and/or roots downward, if desired, by means of a suitable rake, in event the material within the hopper does not feed downward by gravity sufficiently fast to give the desired result.

The agitator 174 swings about the axis of upright shaft 172 to move all the grass sprigs and/or roots within recess 178 into close proximity within the toothed feeding disc 144 upon each arcuate movement of the agitator. In this manner all the sprigs and/or roots of grass will be fed directly from recess 178 without permitting the grass sprigs and/or roots to become abridged to result in a poor stand. An outstanding finger 186 mediate the abutments 176 to agitator 174 rake the grass sprigs and/or roots across the periphery of toothed feeding disc 144 each time the agitator 174 moves through an arc of ninety degrees.

The outstanding finger 186 is preferably made of spring steel wire so in event of engagement of the finger with the teeth 183 on disc 144, while the disc 144 is rotating the finger 186 will spring upward and over teeth 183. However, the normal adjustment of the height of teeth 183 extending into hopper 180 is such that oscillatory movement of finger 186 will be above the top of teeth 183.

While I have shown my invention in only one form, it will be obvious to those skilled in the art that it is not so limited, but is susceptible of various changes and modifications without departing from the spirit thereof.

I claim:

1. A planter for planting grass sprigs and/or roots, which planter comprises:
   (a) a frame,
   (b) a furrow opening plow mounted near the forward end of said frame in position to engage the ground,
   (c) a pair of frame supporting wheels mounted on said frame near the forward end thereof and forming earth compacting means,
   (d) a hopper mounted on the upper side of said frame for containing grass sprigs and/or roots,
   (e) horizontal pivot means on said frame and said hopper to enable relative pivotal movement between said hopper and said frame,
   (f) said hopper having an off-set portion in the bottom thereof which forms a recess,
   (g) which hopper has an elongated slot formed in the recessed portion thereof,
   (h) a shaft rotatably mounted on said frame transversely thereof,
   (i) a vertically disposed, toothed feeding disc mounted on said transverse shaft and being secured thereto and rotatable therewith, and having the teeth on the upper side thereof extending through said elongated slot in said hopper and the teeth on the lower side thereof extending downward into the furrow opened by said plow,
      (1) said horizontal pivot means forming an adjustment for said toothed disc relative to said hopper,
   (j) power driving means,
   (k) an upstanding shaft mounted on the lower side of said hopper and extending into the recessed portion of said hopper through the bottom thereof,
   (l) an arcuate agitator mechanism mounted on said upstanding shaft and being arcuately movable thereby and being adjustably movable therewith about said horizontal pivot means,
      (1) the arcuate portion of said arcuate agitator mechanism being in relatively close fitting relation with the complementary, forward portion of said hopper,
      (2) an abutment formed on each side of said arcuate agitator mechanism, which abutments are upstanding with respect to the bottom of said hopper,
      (3) a portion of said arcuate agitator mechanism extending into said hopper,
   (m) said agitator mechanism having a plane upper surface which joins with the abutments thereon,
      (1) said plane upper surface of said arcuate agitator mechanism being partially covered, at all times with a portion of the bottom of said hopper,
   (n) said upstanding shaft, mounting said agitator mechanism in said hopper, being connected in driven relation with said power driving means,
   (o) said toothed disc mounted on said transverse shaft being connected in driven relation with said power driving means,
   (p) the portion of said agitator mechanism which extends into said hopper, upon oscillation thereof in opposite directions, positively moves the grass sprigs and/or roots within said hopper arcuately by means of said abutments into contact feeding relation with said toothed feeding disc.

2. A planter for planting grass sprigs and/or roots, which planter comprises:
   (a) a movable, wheeled frame,
   (b) a furrow opening plow mounted near the forward end of said frame in position to engage the ground,
   (c) a hopper mounted on the upper side of said frame for containing grass sprigs and/or roots, said hopper having an elongated opening formed in the bottom thereof,
   (d) a vertically disposed, toothed feeding disc mounted in alignment with said furrow opening plow to partially extend through said elongated slot in said hopper,
   (e) power means for rotating said toothed disc,
   (f) an agitator mounted for oscillatory movement along the bottom of the inside of said hopper, said agitator having an abutment on each side of the elongated opening in the bottom of said hopper, said abutments being adapted to move alternately into close proximity with the teeth of the tooth disc as the agitator is oscillated,
   (g) power means for oscillating the agitator,
   (h) covering means mounted on said frame rearwardly of said toothed disc members to cover the formed furrows, and
   (i) a finger mounted on the agitator in said hopper a spaced distance from the bottom of said hopper and above the toothed disc member.

3. A planter for planting grass sprigs, roots and the like, which planter comprises in combination:
   (a) a movable, wheeled frame;
   (b) a hopper mounted on said wheeled frame,
      (1) said hopper having a plurality of spaced apart, elongated openings formed in the bottom thereof;

(c) spaced apart, toothed disc members rotatably mounted on said wheeled frame and being disposed in an upright plane;
  (1) a portion of each toothed disc member extending into a respective one of said openings in the bottom of said hopper,
(d) drive means mounted on said wheeled frame and being operatively connected to said toothed disc members for rotation thereof;
(e) ground engaging members mounted on said wheeled frame to selectively engage the ground ahead of and in alignment with the respective toothed members to form furrows;
(f) covering means mounted on said frame rearwardly of said toothed disc members to cover the formed furrows;
(g) fingers mounted in said hopper a spaced distance from the bottom thereof and above the teeth of the respective toothed disc members which which extend into the respective openings;
(h) operating means to move each finger in alternate directions across the respective openings in the bottom of said hopper simultaneously as the planter moves over the terrain; and
(i) an agitator disposed in said hopper and having an abutment on each side of each said elongated opening in the bottom of said hopper and powered to move reciprocably along the bottom thereof and into close proximity to the teeth of the toothed disc members.

4. A planter for planting grass sprigs, roots and the like, which planter comprises in combination:
(a) a movable, wheeled frame;
(b) a hopper mounted on said wheeled frame,
  (1) said hopper having a plurality of openings formed in the bottom thereof;
(c) a plurality of toothed disc members rotatably mounted on said wheeled frame and being disposed in an upright plane to extend respectively into the openings in the bottom of said hopper;
(d) a ground engaging, furrow opening member mounted on said wheeled frame to selectively engage the ground ahead of and in alignment with said toothed disc members to form furrows;
(e) covering means mounted on said frame rearwardly of said toothed disc members to cover the furrows;
(f) a plurality of fingers mounted in said hopper a spaced distance from the bottom thereof and above the periphery of the teeth of said toothed members extending through the respective openings so at least one of said fingers is associated with each of the respective openings;
(g) means connecting said fingers to reciprocably move said fingers back and forth across their respective openings simultaneously with the movement of the planter over the terrain; and (h) an agitator disposed in said hopper and having an abutment on each side of each of the openings in the bottom of said hopper, and powered to move back and forth along the bottom thereof and into close proximity to the teeth of the toothed disc members.

5. A planter for planting grass sprigs, roots and the like, which planter comprises in combination;
(a) a movable, wheeled frame;
(b) a hopper mounted on said wheeled frame,
  (1) said hopper having at least one elongated opening formed in the bottom thereof;
(c) at least one toothed disc member rotatably mounted on said wheeled frame and being disposed in an upright plane,
  (1) a portion of said toothed disc member extending into the elongated opening in the bottom of said hopper;
(d) drive means mounted on said wheeled frame and being operatively connected to said toothed disc member for rotation thereof;
(e) a ground engaging member mounted on said wheeled frame to engage the ground ahead of and in alignment with said toothed disc member to form a furrow;
(f) covering means mounted on said frame rearwardly of said toothed disc member to cover the formed furrow upon forward movement of said movable wheeled frame;
(g) at least one finger mounted in said hopper a spaced distance from the bottom thereof and above the teeth of said toothed disc member;
(h) operating means to move said finger in alternate directions over said toother disc member and the elongated opening in the bottom of said hopper simultaneously as the planter moves over the terrain; and
(i) an agitator disposed in said hopper and having an abutment on each side of each said elongated opening in the bottom of said hopper and powered to move back and forth along the bottom thereof and into close proximity to the teeth of the toothed disc members.

References Cited by the Examiner
UNITED STATES PATENTS

| | | | |
|---|---|---|---|
| 231,043 | 8/1880 | Horine | 222—234 X |
| 231,374 | 8/1880 | Taylor | 222—234 X |
| 555,044 | 2/1896 | Jones. | |
| 2,715,882 | 8/1955 | Overstreet | 111—3 |
| 3,026,001 | 3/1962 | Landgraf | 111—3 |

ANTONIO F. GUIDA, *Acting Primary Examiner.*

WILLIAM A. SMITH, III, ABRAHAM G. STONE,
*Examiners.*